United States Patent
Lin (10) Patent No.: US 8,797,319 B2
(45) Date of Patent: *Aug. 5, 2014

(54) SYSTEMS AND METHODS FOR VISUALIZING MULTIPLE VOLUMETRIC DATA SETS IN REAL TIME

(71) Applicant: Landmark Graphics Corporation, Houston, TX (US)

(72) Inventor: Jim Ching-Rong Lin, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/099,675

(22) Filed: Dec. 6, 2013

(65) Prior Publication Data

US 2014/0098097 A1 Apr. 10, 2014

Related U.S. Application Data

(63) Continuation of application No. 12/006,714, filed on Jan. 4, 2008, now Pat. No. 8,638,328.

(60) Provisional application No. 60/883,722, filed on Jan. 5, 2007.

(51) Int. Cl.
*G06T 15/00* (2011.01)
*G06T 17/00* (2006.01)
*G09G 5/00* (2006.01)
*G06K 9/00* (2006.01)

(52) U.S. Cl.
USPC ............ 345/419; 345/424; 345/612; 382/109

(58) Field of Classification Search
None
See application file for complete search history.

(56) References Cited

U.S. PATENT DOCUMENTS 5,995,108 A * 11/1999 Isobe et al. ................... 345/421

OTHER PUBLICATIONS

Li, Aili, Klaus Mueller, and Thomas Ernst. "Methods for efficient, high quality volume resampling in the frequency domain." Visualization, 2004. IEEE. IEEE, 2004.*

Hadwiger, Markus, Christoph Berger, and Helwig Hauser. "High-quality two-level volume rendering of segmented data sets on consumer graphics hardware." Visualization, 2003. VIS 2003. IEEE. IEEE, 2003.*

* cited by examiner

*Primary Examiner* — Kee M Tung
*Assistant Examiner* — Zhengxi Liu
(74) *Attorney, Agent, or Firm* — Crain, Caton & James; Bradley A. Misley (57) ABSTRACT

Systems and methods for visualizing multiple volumes of three-dimensional data. A graphics card is used for voxel intermixing, pixel intermixing and image intermixing, which produces a final-combined image of the three-dimensional data in real time.

25 Claims, 3 Drawing Sheets
(3 of 3 Drawing Sheet(s) Filed in Color)

SYSTEMS AND METHODS FOR VISUALIZING MULTIPLE VOLUMETRIC DATA SETS IN REAL TIME

CROSS-REFERENCE TO RELATED APPLICATIONS

This application is a continuation of U.S. patent application Ser. No. 12/006,714, which is hereby incorporated by reference, and claims the priority of U.S. Provisional Patent Application No. 60/883,722, filed on Jan. 5, 2007, which is incorporated herein by reference.

STATEMENT REGARDING FEDERALLY SPONSORED RESEARCH

Not applicable.

FIELD OF THE INVENTION

The present invention generally relates to the visualization of multiple volumetric data sets—also referred to as three-dimensional-volume data sets. A graphics processing unit ("GPU"), sometimes referred to as a graphics card, is used to visualize (co-render) the three-dimensional-volume data sets at interactive rates—meaning in real time.

BACKGROUND OF THE INVENTION

In the applied sciences, various fields of study require the analysis of two-dimensional or three-dimensional volume data sets wherein each data set may have multiple attributes representing different physical properties. An attribute, sometimes referred to as a data value, represents a particular physical property of an object within a defined two-dimensional or three-dimensional space. A data value may, for instance, be an 8-byte data word which includes 256 possible values. The location of an attribute is represented by (x, y, data value) or (x, y, z, data value). If the attribute represents pressure at a particular location, then the attribute location may be expressed as (x, y, z, pressure).

In the medical field, a computerized axial topography (CAT) scanner or magnetic resonance imaging (MRI) device is used to produce a picture or diagnostic image of some specific area of a person's body, typically representing the coordinate and a determined attribute. Normally, each attribute within a predetermined location must be imaged separate and apart from another attribute. For example, one attribute representing temperature at a predetermined location is typically imaged separate from another attribute representing pressure at the same location. Thus, the diagnosis of a particular condition based upon these attributes is limited by the ability to display a single attribute at a predetermined location.

Geophysical methods have been used in the search for oil and gas since the late 1800's when the earliest tools used gravity measurements to identify potentially hydrocarbon-bearing rocks. Reflection and refraction-seismic data were first used for exploration in the 1920's. Early interpretation by a geologist or a geophysicist, hereinafter referred to as geoscientists or interpreters, was made by hand-marking on seismograph film and later on large paper "bed sheets," The process was tedious and time consuming.

Two-dimensional seismic surveys were first created by laying a grid pattern of long cables containing shot points and receivers over large areas, called surveys. Each cable represents a "line." Shot points emit sound (generated by dynamite or other types of explosions), and receivers, or geophones, record the seismic waves as they reach the receiver. The distance and travel time of the sound waves are recorded at each geophone and graphically represented as seismic wavelets. Originally, only analog data was available, but it was replaced by digital information as the computer age grew. For two-dimensional seismic interpretation, geoscientists made interpretations, based on the character of the wavelet at the actual line and interpolated the information in areas between the lines.

In the 1970's, technological advances allowed the use of three-dimensional seismic. Seismic surveys were designed as dense grids, and data could be represented as a three-dimensional volume or cube. Computer improvements in the 1980's made three-dimensional seismic interpretation on a workstation possible. Early three-dimensional seismic interpretation only permitted geoscientists to observe and interpret data on either vertical sections or horizontal slices.

In the oil and gas industry, three-dimensional seismic-data sets (3D seismic data) are comprised of regularly spaced orthogonal volumes of data samples. The data is displayed in two-dimensional planes as either vertical seismic sections or horizontal seismic slices. In turn, the vertical seismic sections are often displayed in connected, flat planes forming an interlocking "fence" that cuts through a three-dimensional geological region of interest. Interpreters study multiple seismic displays to interpret the location and nature of geological structures and stratigraphic boundaries and to plan well locations.

Resulting from the accelerated processing capabilities of modern computers, the use of dense three-dimensional seismic data has surpassed the use of two-dimensional seismic in petroleum exploration. Volume visualization has also become a fundamental feature in mainstream interpretation applications. Typically, applications present seismic volumes as slices, fences, shell cubes, and translucent cubes by using different volume rendering techniques. The challenges of volume visualization are mainly speed and size. Today's standard computer provides greater computation power than yesterday's super computer. 64-bit computers easily load several gigabytes of data into memory, and computer clusters push volume sizes ever larger.

This accelerated computation power now makes visualization of multiple seismic volumes possible. Visualizing multiple raw volumes and attribute volumes can increase understanding of their relationships and improve interpretation of oil and gas prospects. The importance of the combination of multiple volumes is well known.

Today's workstations and visualization technology let interpreters see data in a truly realistic, three-dimensional environment, more closely resembling the actual rocks beneath the Earth's surface. With three-dimensional volumes, the subsurface seismic wave field is closely sampled in every direction, resulting in more accurate structural and stratigraphic interpretation. Computers allow the seismic volume to display as voxels, or volume elements, that may be rendered with differing degrees of opacity and may be calculated using specific attribute algorithms.

The seismic data is collected and processed to produce three-dimensional volume data sets comprising "voxels" or volume elements, whereby each voxel may be identified by the x, y, z coordinates of one of its eight corners or its center. Each voxel also represents a numeric data value (attribute) associated with some measured or calculated physical property at a particular location. Examples of geological seismic data values include amplitude, phase, frequency, and semblance. Different data values are stored in different three-dimensional volume data sets, wherein each three-dimensional volume data set represents a different data value. When multitude data sets are used, the data value for each of the data sets may represent a different physical parameter or attribute for the same geographic space. By way of example, a plurality of data sets could include a seismic volume, a temperature volume and a water-saturation volume. The voxels in the seismic volume can be expressed in the form (x, y, z, seismic amplitude). The voxels in the temperature volume can be expressed in the form (x, y, z, ° C.). The voxels in the water-saturation volume can be expressed in the form (x, y, z, % saturation). The physical or geographic space defined by the voxels in each of these volumes is the same. However, for any specific spatial location $(x_o, y_o, z_o)$, the seismic amplitude would be contained in the seismic volume, the temperature in the temperature volume and the water-saturation in the water-saturation volume. In order to analyze certain sub-surface geological structures, sometimes referred to as "features" or "events," information from different three-dimensional volume data sets may be separately imaged in order to analyze the feature or event.

Geoscientists examine the seismic data to identify continuous reflections, which often represent horizons, and discontinuities in these reflections, which represent faults or other structural components capable of trapping hydrocarbons. Anomalies, such as a "bright spot," in horizons frequently indicate the presence of oil or gas.

Software technology permits interpreters to use a variety of industry-standard algorithms to calculate attributes on seismic volumes. The purpose is to extract information about a seismic horizon that might identify hydrocarbons. An attribute, for example, may contain time, amplitude, frequency, and attenuation information for the seismic data. Geoscientists select algorithms and make calculations over the seismic data to reveal areas of interest that would otherwise remain obscured. Some of the common attribute calculations measure frequency, phase, azimuth, dip-azimuth, and edge detection. Bandpass filters allow only selected frequencies to pass through a calculation window. More recently, algorithms have also measured spectral decomposition of the seismic data.

The use of multiple volumes in visualization is one of the leading trends for hydrocarbon exploration and production operations. Visualization can incorporate data from multiple three-dimensional surveys and time lapse four-dimensional seismic surveys into a single display. There are several approaches for visualizing multiple three-dimensional volume data sets. The simplest approach is to show corresponding displays from each dataset in separate, linked views with coupled cursors. Another approach is to combine multiple data sets into a single display. As such, coherency and amplitude volumes can be combined using bump mapping, in which the hue of each pixel is controlled by the reflection amplitude and the lighting (bump effect) is controlled by the coherency value. Data animation can show four-dimensional time-lapse sequences; this technique is especially effective for reservoir simulation results in which the changes in the seismic data, the reservoir fluids, and the well logs are compared over time.

Traditionally, software displayed each volume in a separate window. This approach makes it difficult to analyze the coherence and relationship between volumes. Using overlays and combinations of volumes makes interpreting the data much easier.

Methods are known in the art regarding how to calculate, manage, and interpret attribute volumes using volume-based techniques, which allow interpreters to quantitatively estimate rock and fluid properties for a reservoir. Combining multiple volumes for oil and gas data visualization and using multiple attributes and disciplines in the visualization process helps geoscientists to classify reservoirs based on empirical correlation to geologic and petrophysical information.

Modern software applications allow simultaneous use of multiple seismic volumes. For instance, an interpreter may look at a standard time domain seismic volume while observing the same data in a discontinuity volume. The concept of multiple volume interpretation lets the geoscientist rapidly interpret large areas of data with far greater accuracy and speed.

The "stencil" paradigm in two-dimensional painting programs to combine multiple volumes has been previously used. Three possible ways, including RGBA color, opacity, and intensity, are used to define transfer function. Each volume can be associated with one of these three types of transfer functions, and the layers are combined at the fragment level. Each layer's transfer function is pre-integrated independently and composite.

In addition to oil and gas exploration, other fields, in particular medicine, have greatly contributed to multi-volume rendering research. Radiotherapy treatment planning involves three volumes: a Computed tomography (CT) volume, a Dose volume, and a Segmented Object volume. Ray Casting direction volume rendering is then applied. Three levels of data intermixing have been defined: image level, accumulation, and illumination intermixing. The combination of position emission tomography (PET), CT, and magnetic resonance imaging (MRI) medical volumes have previously been used. Ray casting volume rendering was also used. Such applications combine cutting techniques and data-intermixing techniques.

In the past decade, the three-dimensional graphics computational power and on-board memory in off-the-shelf graphics cards have sustained rapid growth. The programmability of the graphics processing unit (GPU) opens up new possibilities to move some of the central processing unit (CPU) algorithms to the GPU for improved performance and quality. For example, U.S. Pat. No. 7,298,376 (the "'376 Patent"), which is assigned to Landmark Graphics Corporation and incorporated herein by reference, uses a graphics card to co-render multiple attribute volumes in real time as an enhanced image. Nevertheless, this technique is limited by the specific algorithm(s) used to perform pixel intermixing by bump mapping.

Other techniques have been developed in this field for imaging multiple three-dimensional volume data sets in a single display, however, not without considerable limitations. One example includes the technique published in *The Leading Edge* called "Constructing Faults from Seed Picks by Voxel Tracking" by Jack Lees. This technique combines two three-dimensional volume data sets in a single display, thereby restricting each original 256-value attribute to 128 values of the full 256-value range. The resolution of the display is, therefore, significantly reduced, thereby limiting the ability to distinguish certain events or features from the rest of the data. Another conventional method combines the display of two three-dimensional volume data sets, containing two different attributes, by making some data values more transparent than others. This technique becomes untenable when more than two attributes are combined.

Another technique used to combine two different three-dimensional volume data sets in the same image is illustrated in U.S. Pat. No. 6,690,820, which is assigned to Landmark Graphics Corporation and incorporated herein by reference. This patent describes a technique for combining a first three-dimensional volume data set representing a first attribute and a second three-dimensional volume data set representing a second attribute in a single enhanced three-dimensional volume data set by comparing each of the first and second attribute data values with a preselected data value range or criteria. For each data value where the criteria are met, a first selected data value is inserted at a position corresponding with the respective data value in the enhanced three-dimensional volume data set. For each data value where the criteria are not met, a second selected data value is inserted at a position corresponding with the respective data value in the enhanced three-dimensional volume data set. The first selected data value may be related to the first attribute and the second selected data value may be related to the second attribute. The resulting image is an enhanced three-dimensional volume data set comprising a combination or hybrid of the original first three-dimensional volume data set and the second three-dimensional volume data set. As a result, the extra processing step needed to generate the enhanced three-dimensional volume data set causes interpretation delays and performance slow downs. Furthermore, this pre-processing technique is compromised by a "lossy" effect which compromises data from one seismic attribute in order to image another seismic attribute. Consequently, there is a significant loss of data visualization.

There is therefore, a need for alternative techniques to image multiple three-dimensional volume data sets in real time as a final combined image, which are not limited by a specific algorithm for intermixing voxels, pixels and/or images.

SUMMARY OF THE INVENTION

The present invention meets the above needs and overcomes one or more deficiencies in the prior art by providing systems and methods for visualizing multiple three-dimensional-volume data sets in real time.

In one embodiment, the present invention includes a method for imaging a plurality of three-dimensional volume data sets, which represent different attribute volumes, as a final image, which comprises: i) accepting input from a user at runtime to identify the different attribute volumes to be intermixed, wherein intermixing the different attribute volumes corresponds to combining attributes for the different attribute volumes, wherein the attributes are associated on a data level, a voxel level, a pixel level, or an image level; ii) accepting an equation from a user at runtime to be used at any selected step of intermixing from voxel intermixing, a pixel intermixing, and image intermixing; iii) processing each attribute volume without a graphics card by data intermixing to form a first combined attribute volume or a first plurality of corresponding attribute volumes based on the different attribute volumes, wherein the data intermixing applies to intermixing tasks not suitable for the graphics card; iv) processing the first combined attribute volume or the first plurality of corresponding attribute volumes using a pixel shader of the graphics card by the voxel intermixing to filter and remove data from the first combined attribute volume or the first plurality of corresponding attribute volumes and to form a second combined attribute volume or a second plurality of corresponding attribute volumes; v) processing the second combined attribute volume or the second plurality of corresponding attribute volumes using a pixel shader of the graphics card by the pixel intermixing to form a third combined attribute volume or a third plurality of corresponding attribute volumes, wherein the third combined attribute volume or the third plurality of corresponding attribute volumes correspond to a rendered image or rendered images; and vi) processing the third combined attribute volume or the third plurality of corresponding attribute volumes using the graphics card by the image intermixing to form the final image that combines the rendered image or rendered images based on the third combined attribute volume's attributes or the third plurality of corresponding attribute volume's attributes.

In another embodiment, the present invention includes a non-transitory computer readable medium having computer executable instructions for imaging a plurality of three-dimensional volume data sets, which represent different attribute volumes, as a final image, the instructions being executable to implement: i) accepting input from a user at runtime to identify the different attribute volumes to be intermixed, wherein intermixing the different attribute volumes corresponds to combining attributes for the different attribute volumes, wherein the attributes are associated on a data level, a voxel level, a pixel level, or an image level; ii) accepting an equation from a user at runtime to be used at any selected step of intermixing from voxel intermixing, a pixel intermixing, and image intermixing; iii) processing each attribute volume without a graphics card by data intermixing to form a first combined attribute volume or a first plurality of corresponding attribute volumes based on the different attribute volumes, wherein the data intermixing applies to intermixing tasks not suitable for the graphics card; iv) processing the first combined attribute volume or the first plurality of corresponding attribute volumes using a pixel shader of the graphics card by the voxel intermixing to filter and remove data from the first combined attribute volume or the first plurality of corresponding attribute volumes and to form a second combined attribute volume or a second plurality of corresponding attribute volumes; v) processing the second combined attribute volume or the second plurality of corresponding attribute volumes using a pixel shader of the graphics card by the pixel intermixing to form a third combined attribute volume or a third plurality of corresponding attribute volumes, wherein the third combined attribute volume or the third plurality of corresponding attribute volumes correspond to a rendered image or rendered images; and vi) processing the third combined attribute volume or the third plurality of corresponding attribute volumes using the graphics card by the image intermixing to form the final image that combines the rendered image or rendered images based on the third combined attribute volume's attributes or the third plurality of corresponding attribute volume's attributes.

Additional aspects, advantages and embodiments of the invention will become apparent to those skilled in the art from the following description of the various embodiments and related drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The present invention is described below with references to the accompanying drawings, and in which.

DETAILED DESCRIPTION OF THE PREFERRED EMBODIMENTS

The subject matter of the present invention is described with reference to certain preferred embodiments however, is not intended to limit the scope of the invention. The claimed subject matter thus, might also be embodied in other ways to include different steps, or combinations of steps, similar to the ones described herein and other technologies. Although the term "step" may be used herein to describe different elements of methods employed, the term should not be interpreted as implying any particular order among or between various steps herein disclosed unless otherwise expressly limited by the description to a particular order.

Figure 1:
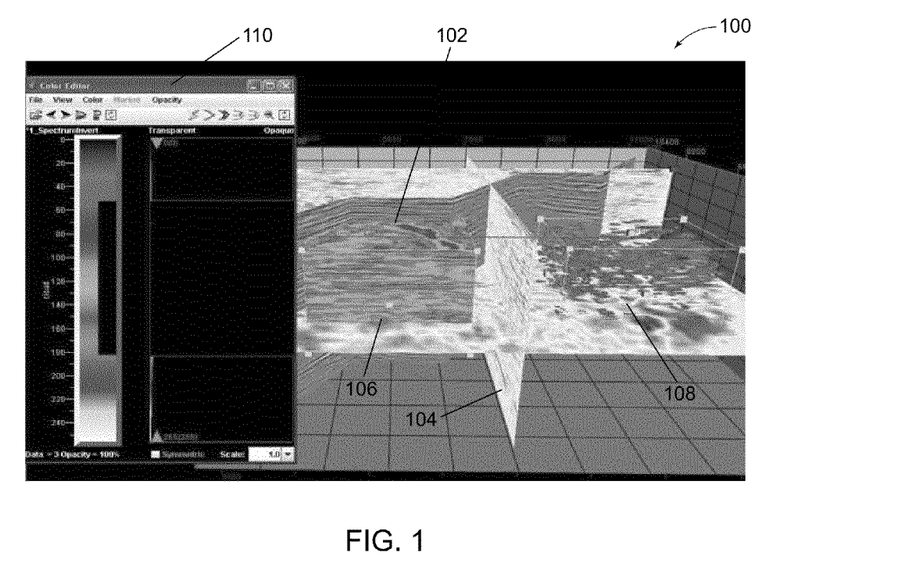
FIG. 1 is a color drawing illustrating a display of multiple three-dimensional data-objects.

Referring now to FIG. 1, a display 100 illustrates multiple three-dimensional data-objects such as, for example, a volume fence 102, a volume slice 104, a volume box 106, and a translucent cube 108, which has been volume rendered. Each three-dimensional data-object is the result of processing a three-dimensional volume data set comprising seismic data, however, may also include other types of data. The volume box 106 only shows six sides of a cube and is empty inside. A typical approach for this type of volume visualization is to apply two-dimensional or three-dimensional texture maps to the display 100, which is a visualization technique that is well known in the art. A two-dimensional texture is used for the fence 102, the slice 104 and the box 106 because of graphics memory considerations. A three-dimensional volume data set may be several gigabytes in size, so the whole volume may have to be divided into smaller volumes to fit into graphics memory for three-dimensional texture. Therefore, it is not efficient and practical to use three-dimensional textures for a fence 102, a slice 104, or a box 106. After the texture is defined for a three-dimensional data object, a color table 110 may be applied and used as a color lookup and transfer function.

Figure 2A:
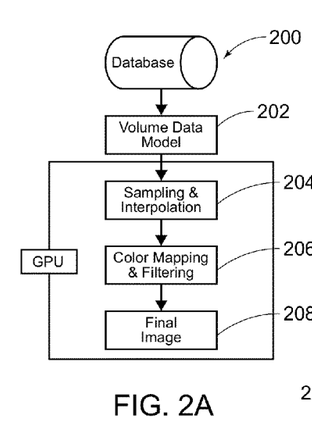
FIG. 2A is a flow diagram illustrating a conventional method for visualizing a single three-dimensional volume data set.

Referring now to FIG. 2A, a flow diagram illustrates a conventional method 200 for visualizing a single three-dimensional volume data set and producing multiple three-dimensional data-objects like those illustrated in FIG. 1. After raw seismic data and other data types (e.g. log data) are acquired, they must be processed and/or stored with any corresponding information, such as world coordinates, in a Database.

In step 202, the stored data is accessed from the Database as a three-dimensional volume data set (Volume Data Model).

In step 204, sampling or interpolation are applied because the data (voxels) are projected to pixels according to the geometry of volume graphics (e.g. a slice). This step is applied in a voxel domain, but not in an image domain. Dependent texturing, which is well known in the art, may be used with a pixel shader to perform this step. Two textures may be used: one for the Volume Data Model and one for a color table. A pixel shader performing a two-dimensional (or three-dimensional) texture lookup into the first texture map generates the texture coordinates for the second texture lookup. This type of linear texture filtering is the same operation used for sampling or interpolation in typical seismic-data visualization and can produce high-quality seismic-data visualization.

In step 206, the color table acts as a color map and filter. The alpha channel of the color table may be used to specify a display range for the Volume Data Model.

In step 208, a Final Image is produced, which may comprise any one of the three-dimensional data-objects illustrated in FIG. 1. The method 200 uses the GPU to perform steps 204, 206 and 208.

Figure 2B:
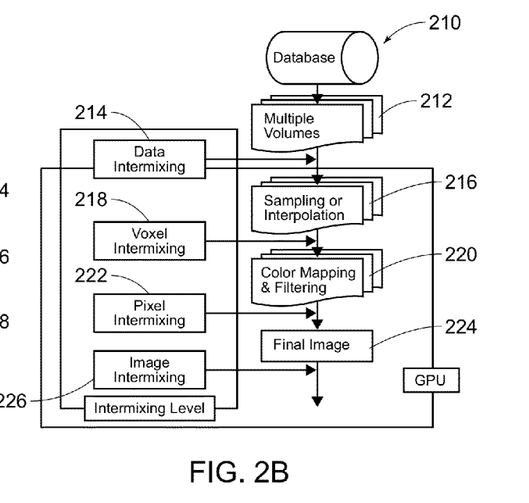
FIG. 2B is a flow diagram illustrating one embodiment of a method for implementing the present invention.

Referring now to FIG. 2B, a flow diagram illustrates one embodiment of a method 210 for implementing the present invention by processing multiple three-dimensional volume data sets for visualization. After raw seismic data and other data types are acquired, they must be processed and/or stored with any corresponding information in a Database. After processing and computing this raw data, other volumetric data may be generated.

In step 212, the stored data is accessed from the Database as Multiple Volumes. The method 210 applies four different intermixing levels (steps) to the Multiple Volumes: Data Intermixing, Voxel Intermixing, Pixel Intermixing and Image Intermixing. The use of a texture-based volume visualization technique for method 210 is preferred for volume rendering.

Figure 4:
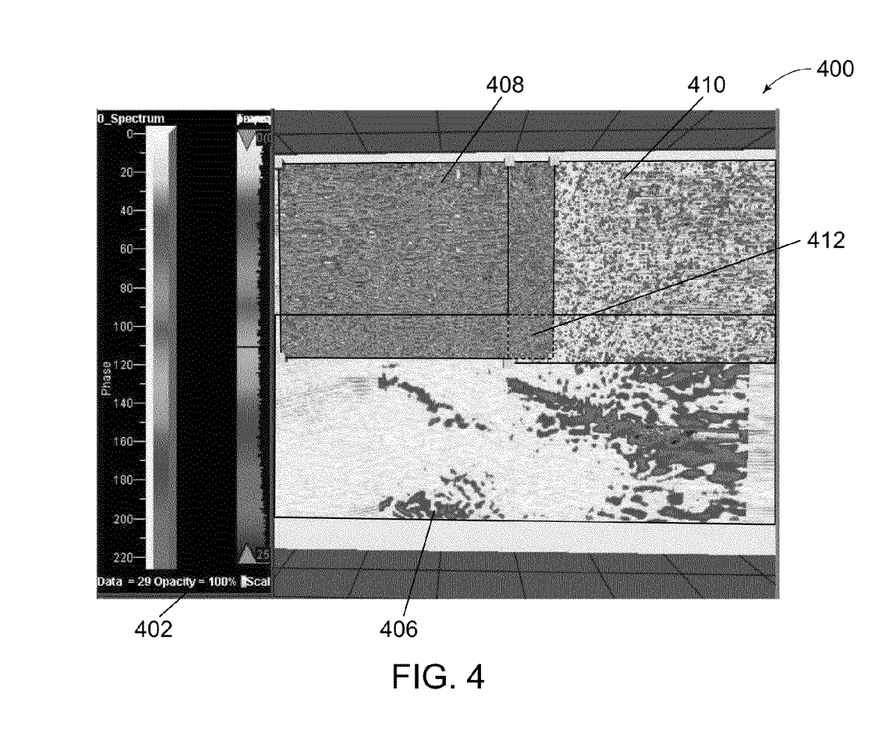
FIG. 4 is a color drawing illustrating an exemplary display of image intermixing according to the present invention.

In step 214, the Multiple Volumes from step 212 can be combined as a single volume by using specific equations for Data Intermixing, such as calculating the difference between two time-lapse (four-dimensional) seismic surveys. A new volume can be calculated and generated at this step; for example, phase or frequency may be extracted from an amplitude volume as illustrated in FIG. 4, In FIG. 4, a frequency attribute image 408 and a phase attribute image 410 were extracted from an amplitude volume of seismic data. Data Intermixing also can generate new corresponding volumes at the data type level (for example, seismic data or well log data). Because processing and computations are typically very complicated and time consuming, they are prepared separately from the initial interpretation process. Some attributes, such as phase, frequency, and reflection, can be computed and generated in real time, but their algorithms are still complex. Therefore, this type of Data Intermixing is not placed into the GPU for this step of the method 210. Moving some of these algorithms to a GPU may benefit performance and visualization in other applications, however.

Another type of Data Intermixing is for volumes that have different local coordinate systems and sizes. A primary volume may be used at step 212 to define the geometry and coordinate system. The secondary volumes must be converted to the same coordinate system as the primary volume. Because this type of conversion requires extensive scientific domain knowledge, step 214 is best performed outside the system framework illustrated in FIG. 3. However, this kind of Data Intermixing can be performed in the Primary Volume Model or the Secondary Volume Models of FIG. 3. The system framework provides utilities to help define relationships between the Secondary Volume Models and the Primary Volume Model, which applies Sampling and Interpolation for conversions.

In step 216, a texture linear filter is applied for Sampling or Interpolation, which are well known in the art. After that, the number of voxels may differ from the number of voxels in the original volume.

In step 218, Multiple Volumes can be combined by using specific algorithms or may be passed directly to the next step. A pixel shader can accomplish Voxel Intermixing after texturing. The following is an exemplary Cg program showing the difference for two volumes at this step for Voxel Intermixing:

float vol1=tex2D(image1,IN.texCoord).x;

float vol1=tex2D(image1,IN.texCoord).x;float
        vol2=tex2D(image1,IN.texCoord).x float intermix=vol1-vol1;

Cg is a programming language available from NVIDIA®, however, other programming languages may be used such as, for example, Open GL GLSL and Direct 3D HLSL, which are well known in the art. A tex2D routine is used at this step, however, a tex3D routine may be used for three-dimensional textures or texture-based volume rendering. More complicated equations can be applied and conditional statements used to filter out data at this step for Voxel Intermixing.

In step 220, associated color tables are used to map and/or filter voxels into pixels. The color table acts as a color lookup and transfer function. An exemplary Cg statement is "float4 pixel=tex1D(colormap, index)" where variable "colormap" is the texture of color table and "index" is the voxel.

In step 222, the pixel(s) associated with each volume can be combined by equations. OpenGL equations, such as modulation, decal, and add are examples. Another popular Pixel Intermixing technique is bump mapping, in which specular lighting is controlled by one volume. This technique (bump mapping) is further described in the '376 Patent, With the use of a pixel shader, many equations as well as conditional statements can be applied in the pixel, red, green, blue, or alpha domain.

In step 224, a Final Image may be rendered (displayed) or the method 210 may proceed to the next step 226 before rendering a Final Image. A Final Image therefore, may be rendered as a result of any one of the intermixing steps (214, 218, 222, 226) or any combination of the intermixing steps.

In step 226, Image Intermixing is used to combine the images associated with each volume. Image intermixing combines layers of volume graphics (i.e. multiple three-dimensional volume data sets) and applies an OpenGL blending function. In FIG. 4, for example, four volume slices of seismic data are combined together in a display 400 of image intermixing according to step 226. An amplitude volume is the base volume. A reflection attribute image 406, a frequency attribute image 408 and a phase attribute image 410 complete the four volume slices combined in the display 400. As illustrated by the dotted line, the reflection attribute image 406, the frequency attribute image 408 and the phase attribute image 410 overlap each other to form a combined image 412. Each volume slice has a corresponding color table, which can be edited using the interface 402. Each volume slice also has its own manipulator so that the volume slice can be resized and moved. Using three-dimensional graphics, multiple volume images can be easily created and manipulated with high performance results. The fast display capability is a result of the GPU directly handling the image rendering.

Figure 3:
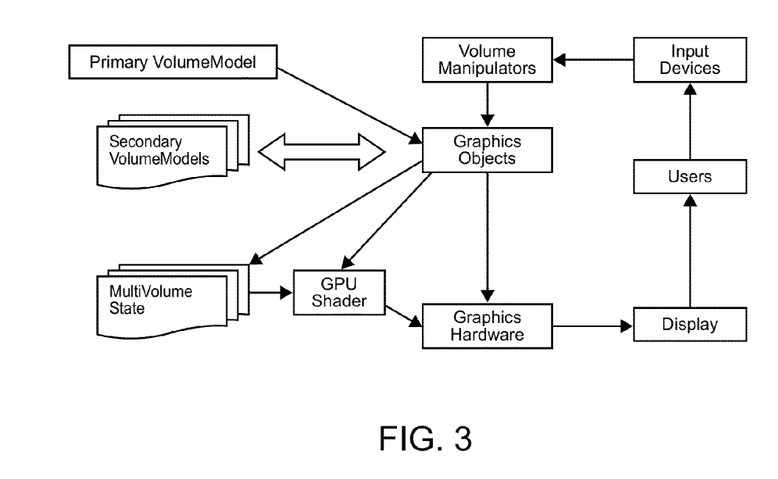
FIG. 3 is a schematic diagram illustrating one embodiment of a system framework for implementing the present invention.

The four intermixing steps may be implemented in the system framework illustrated in FIG. 3 using a Java-based graphics toolkit. Cg is used as the GPU programming language and describes the basic architecture. This system framework conceptually allows the use of unlimited volumes and employs a different approach to accomplish the four steps of intermixing. The system framework requirements for FIG. 3 therefore, dictate flexibility and extendibility at each intermixing step 214, 218, 222, 226 of the method 210. In addition to the typical volume graphics (volume fence, volume slice, volume box, and translucent cube) the system framework also supports future volume graphics and any sophisticated algorithm(s) specified by an interpreter or geoscientist. The speed and flexibility permitted by the system framework allows geoscientists or interpreters to experiment with multiple volumes to make quick and accurate decisions about their interpretations.

In FIG. 3, Graphics Objects access subvolumes (Primary VolumeModel and Secondary Volume Models) and then create corresponding textures. The Primary Volume Model is used to specify the geometry of the Graphics Objects. Geometry and volumes are all in local coordinates, which are at indices spacings. The four levels of intermixing are defined and controlled by software for the Primary VolumeModel, the Secondary Volume Models and the MultiVolumeState. The MultiVolumeState software contains multiple texturestate inputs, which manage multi-texturing parameters. If a GPU shader is used, then the shader is assigned into the MultiVolumeState software and takes control over the Graphics Hardware. The MultiVolumeState software simply acts as a passer for the shader. TexShaderModel is a software interface to define a texture shader for volume visualization, which includes multiple volume visualization.

Figure 5:
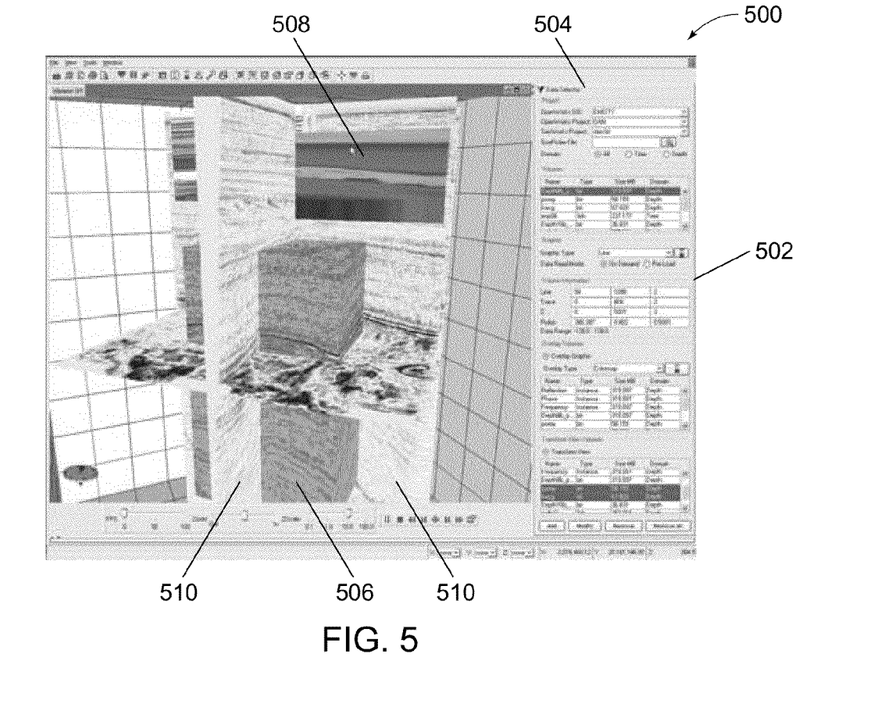
FIG. 5 is a color drawing illustrating an exemplary display of multiple three-dimensional volume data sets according to the present invention.

Referring now to FIG. 5, an exemplary display 500 of multiple three-dimensional volume data sets is illustrated according to the present invention. The display 500 includes a dialog 502 that allows geoscientists to access real oil and gas databases and complete standard work flows. The dialog 502 includes a data selector 504 to access multiple volumes through a formal database. It implements most of the typical features of seismic volume visualization. The display 500 also includes an Overlay image 506 and a TransferView image 508, which are prototype features of the present invention. An image of the base three-dimensional volume data set 510 is illustrated for analysis and comparison.

The display 500 illustrates the flexibility of the present invention, which enables the run-time selection or creation of algorithms for customized intermixing at any step to produce a combined two-dimensional or three-dimensional image of multiple three-dimensional volume data sets such as, for example, the Overlay image 506 and the TransferView image 508. In other words, using the GPU to process Voxel Intermixing, Pixel Intermixing and Image Intermixing permits the selection or creation of algorithms at run-time to produce a combined image of multiple volumes using one or more of the intermixing steps.

The Overlay feature, for example, uses Voxel Intermixing and Pixel Intermixing to create a "custom" overlay. In this embodiment, multiple volumes are entered as input parameters in a shader. A primary volume and secondary volumes may be selected. A text dialog allows the geoscientist to write the equations for the input volumes. Two color tables are associated with primary volume and secondary volumes: "color" and "gray" overlays are provided, which are done at the Pixel Intermixing step. The "color" overlay uses specific color tables while the "gray" overlay uses a gray level color table. The Pixel Intermixing is the same as the OpenGL modulate, which are $C=C_{p1} C_{p2}$ and $A=A_{p1} A_{p2}$, in which p1 is pixel of the primary volume and p2 is the pixel of the secondary volume. To give the maximum flexibility, all Cg libraries and syntax are honored. The final output is an index into the color table of a secondary volume; therefore, the alpha of the color table can be used to filter out data. Another overlay embodiment uses bump-mapping Pixel-Intermixing, which is further described in the '376 Patent. The secondary volume is used to create gradient bump maps.

The TransferView feature uses Image Intermixing to combine multiple volumes into a single image as illustrated by the TransferView image 508 in FIG. 5. The TransferView image 508 is therefore, comparable to the combined (overlapping) image 412 in FIG. 4. Both represent the TransferView feature.

The present invention therefore, offers the advantage of high speed rendering and flexibility with which interpreters can resize and manipulate displays of different volumes. As a result of allowing the GPU to handle most of the intermixing processes, volumes are able to compute and display on-the-fly and in real time-meaning at a frame rate of at least 12 frames per second. This enables geoscientists to rapidly analyze large amounts of data and simultaneously compare multiple volumes to verify their interpretations. It also allows geoscientists to work with simulation models and to use four-dimensional data sets to view changes in oil and gas reservoirs over time.

In another embodiment, the present invention may be described in the general context of a computer-executable program of instructions, such as program modules, generally referred to as software. The software may include, for example, routines, programs, objects, components, data structures, etc., that perform particular tasks or implement particular abstract data types. The software forms an interface to allow a computer to react according to a source of input. The software may also cooperate with other code segments to initiate a variety of tasks in response to data received in conjunction with the source of the received data. The software may be stored onto any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the internet.

Those skilled in the art will appreciate that the present invention may be implemented in a variety of computer-system configurations including hand-held devices, multi-processor systems, microprocessor-based or programmable-consumer electronics, minicomputers, mainframe computers and the like. Any number of computer-systems and computer networks are therefore, acceptable for use with the present invention. The present invention may be practiced in distributed-computing environments where tasks are performed by remote-processing devices that are linked through a communications network. In a distributed-computing environment, the software may be located in both local and remote computer-storage media including memory storage devices.

The present invention may therefore, be implemented using hardware, software or a combination thereof, in a computer system or other processing system.

Figure 6:
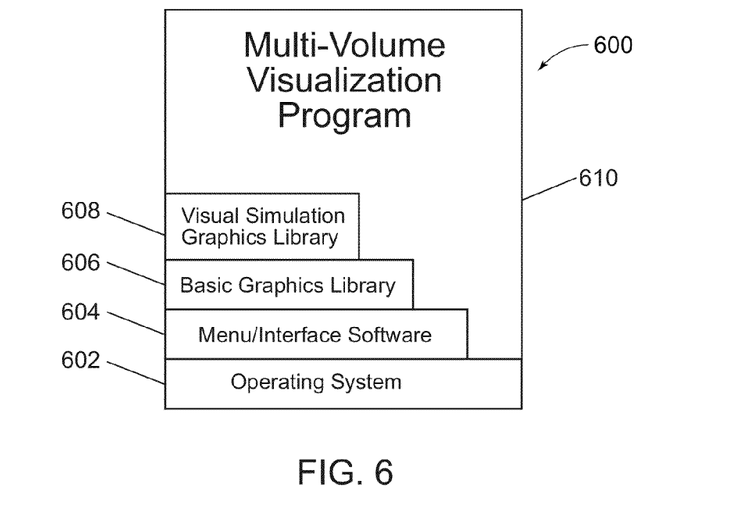
FIG. 6 is a block diagram illustrating one embodiment of a software program for implementing the present invention.

Referring now to FIG. 6, a block diagram illustrates one embodiment of a software program 600 for implementing the present invention. At the base of the program 600 is an operating system 602. A suitable operating system 602 may include, for example, a Windows® operating system from Microsoft Corporation, or other operating systems as would be apparent to one of skill in the relevant art.

Menu/interface software 604 overlays the operating system 602. The menu/interface software 604 is used to provide various menus and windows to facilitate interaction with the user, and to obtain user input and instructions. As would be readily apparent to one of skill in the relevant art, any number of menu/interface software programs could be used in conjunction with the present invention.

A basic graphics library 606 overlays menu/interface software 604. Basic graphics library 606 is an application programming interface (API) for three-dimensional computer graphics. The functions performed by basic graphics library 606 may include, for example, geometric and raster primitives, RGBA or color index mode, display list or immediate mode, viewing and modeling transformations, lighting and shading, hidden surface removal, alpha blending (translucency), anti-aliasing, texture mapping, atmospheric effects (fog, smoke, haze), feedback and selection, stencil planes and accumulation buffer.

A particularly useful basic graphics library 606 is OpenGL®, marketed by Silicon Graphics, Inc. ("SGI®"). The OpenGL® API is a multi-platform industry standard that is hardware, window, and operating system independent. OpenGL® is designed to be callable from C, C++, FORTRAN, Ada and Java programming languages. OpenGL® performs each of the functions listed above for basic graphics library 606. Some commands in OpenGL® specify geometric objects to be drawn, and others control how the objects are handled. All elements of the OpenGL® state, even the contents of the texture memory and the frame buffer, can be obtained by a client application using OpenGL®. OpenGL® and the client application may operate on the same or different machines because OpenGL® is network transparent. OpenGL® is described in more detail in the OpenGL® Programming Guide (ISBN: 0-201-63274-8) and the OpenGL® Reference Manual (ISBN: 0-201-63276-4), both of which are incorporated herein by reference.

A visual simulation graphics library 608 overlays the basic graphics library 606. The visual simulation graphics library 608 is an API for creating real time, multi-processed three-dimensional visual simulation graphics applications. As will be understood by those skilled in the art, the visual simulation graphics library 608 may include a suite of tools for two-dimensional and/or three-dimensional seismic data interpretations including, for example, interactive horizon and fault management, three-dimensional visualization and attribute analysis. The visual simulation graphics library 608 therefore, provides functions that bundle together graphics library state control functions such as lighting, materials, texture, and transparency, These functions track state and the creation of display lists that can be rendered later. Picasso, which is a commercial software package marketed by Landmark Graphics Corporation for use in the oil and gas industry, is an example of an acceptable visual simulation graphics library 608.

The visual simulation graphics library 608, the basic graphics library 606, the menu/interface software 604 and the operating system 602 may be executed on one or more general purpose CPU's as described in U.S. Pat. No. 6,765,570 assigned to Landmark Graphics Corporation and incorporated herein by reference (the "'570 Patent"). An acceptable CPU may include, for example, processors marketed by Intel® and AMD®.

A multi-volume visualization program 610 overlays visual simulation graphs library 608. In a manner generally well known in the art, the program 610 may be configured to interface with, and utilize the functions carried out by, other visualization programs, visual simulation graphics library 608, the basic graphics library 606, the menu/interface software 604, and the operating system 602. Geoprobe® and PowerView®, which are a commercial-software packages marketed by Landmark Graphics Corporation for use in the oil and gas industry, are examples of appropriate visualization-interface applications. Geoprobe® is the commercial embodiment of a sampling probe program, which is described in the '570 Patent.

Program 610 is preferably written in Cg; however, another procedural language may be used such as, for example, Open GL Shader Language ("GLSL"), which is well known in the art and is published (ISBN O-321-9789-5) in "The Open GL Shading Language." GLSL works with individual pixels at ($\mu$, $\nu$) of the projection plane on a display device. Through GLSL shaders, one can determine how a pixel at ($\mu$, $\nu$) is illuminated. In either case, Cg or GLSL may be used to execute the multi-volume visualization program 610 on a GPU in the manner described in reference to FIG. 2B for steps 216-226. The advantages of programming a conventional GPU, instead of a CPU, to execute the program 610 are its large number of registers and its architecture, which enables massive parallelization of the processors. This architecture can process data in the registers in a few GPU cycles—while it may take a few thousand CPU cycles for the same task. An acceptable GPU, for example, may include the NVIDIA®G-70 graphics card and a Quadro 5500 graphics port marketed by NVIDIA®. Other GPU's well known in the art may be acceptable if they are capable of executing fragment (pixel) shader programs written with GLSL and support, at a minimum, looping and branching functions. Exemplary methods that are enabled by the program 610 are further described in reference to FIG. 2B through FIG. 5.

The program 600 illustrated in FIG. 6 may be executed or implemented through the use of a computer system incorporating the program 600 and various hardware components. The system hardware components may include, for example, a processor, memory (e.g., random access memory and/or non-volatile memory devices), one or more input devices, one or more display devices, and one or more input devices. These components may be interconnected according to a variety of configurations as generally illustrated by FIG. 3. Other well known computer system configurations and components that may be used to execute the program 600 are described in the '570 Patent. Non-volatile memory devices may include, for example, devices such as tape drives, semiconductor ROM or EEPROM. Input devices may include, for example, devices such as a keyboard, a mouse, a digitizing pad, a track ball, a touch-sensitive pad and/or a light pen. Display devices may include, for example, devices such as monitors, projectors and/or head-mounted displays. Interface devices may be configured to acquire digital image data from one or more acquisition devices and/or from one or more remote computers or storage devices through a network. Any variety of acquisition devices may be used depending on the type of object being imaged. The acquisition device(s) may sense various forms of mechanical energy (e.g., acoustic (seismic) energy, displacement and/or stress/strain). The input data may be provided to the computer system through a variety of mechanisms. For example, the input data may be acquired into non-volatile memory and/or RAM using one or more interface devices. As another example, the input data may be supplied to the computer system through a memory medium such as a disk or a tape, which is loaded into/onto one of the non-volatile memory devices. In this case, the input data will have been previously recorded onto the memory medium. It is noted that the input data may not necessarily be raw sensor data obtained by an acquisition device. For example, the input data may be the result of one or more processing operations using a set of raw sensor data. The processing operation(s) may be performed by the computer system and/or one or more other computers.

Each processor (GPU and CPU) may be configured to reprogram instructions and/or data from RAM and/or non-volatile memory devices, and to store computational results into RAM and/or non-volatile memory devices.

In this particular embodiment, each three-dimensional volume data set is stored in a manner generally well known in the art. For example, the format for a particular data volume may include two parts: a volume header followed by the body of data that is as long as the size of the data set. The volume header typically includes information in a prescribed sequence, such as the file path (location) of the data set, size, dimensions in the x, y, and z directions, annotations for the x, y and z axes, annotations for the data value, etc. The body of data is a binary sequence of bytes and may include one or more bytes per data value. For example, the first byte is the data value at volume location (0,0,0); the second byte is the data value at volume location (1,0,0); and the third byte is the data value at volume location (2,0,0). When the x dimension is exhausted, then the y dimension and the z dimension are incremented, respectively. This embodiment is not limited in any way to a particular data format.

The program 610 facilitates input from a user to identify one or more three-dimensional volume data sets to use for imaging and analysis. When a plurality of data volumes is used, the data value for each of the plurality of data volumes represents a different physical parameter or attribute for the same geographic space. By way of example, a plurality of data volumes could include a geology volume, a temperature volume, and a water-saturation volume. The voxels in the geology volume can be expressed in the form (x, y, z, seismic amplitude). The voxels in the temperature volume can be expressed in the form (x, y, z, ° C.). The voxels in the water-saturation volume can be expressed in the form (x, y, z, % saturation). The physical or geographic space defined by the voxels in each of these volumes is the same. However, for any specific spatial location ($x_o$, $y_o$, $z_o$), the seismic amplitude would be contained in the geology volume, the temperature in the temperature volume, and the water-saturation in the water-saturation volume.

The program 610 can conceptually handle multiple volumes, visualize multiple volumes and take advantage of recent advancements in programmable graphics processing units. The geoscientist can flexibly write the equations at any step of intermixing: Voxel Intermixing, Pixel Intermixing, and Image Intermixing at runtime and display the results of equations applied to the multiple volumes. The program's 3D "TransferViews" support multiple "TransformViews" using 3D graphics technology.

Because the systems and methods described herein may be used to selectively and interactively analyze various types of data, they may be particularly useful for analyzing medical data or geophysical data, however, may also find utility for analyzing and interpreting any other types of data.

While the present invention has been described in connection with presently preferred embodiments, it will be understood by those skilled in the art that it is not intended to limit the invention to those embodiments, It is therefore, contemplated that various alternative embodiments and modifications may be made to the disclosed embodiments without departing from the spirit and scope of the invention defined by the appended claims and equivalents thereof.

The invention claimed is:

1. A method for imaging a plurality of three-dimensional volume data sets, which represent different attribute volumes, as a final image, which comprises:

accepting input from a user at runtime to identify the different attribute volumes to be intermixed, wherein intermixing the different attribute volumes corresponds to combining attributes for the different attribute volumes, wherein the attributes are associated on a data level, a voxel level, a pixel level, or an image level;

accepting an equation from a user at runtime to be used at any selected step of intermixing from voxel intermixing, pixel intermixing, and image intermixing;

processing each attribute volume without a graphics card by data intermixing to form a first combined attribute volume or a first plurality of corresponding attribute volumes based on the different attribute volumes, wherein the data intermixing applies to intermixing tasks not suitable for the graphics card;

processing the first combined attribute volume or the first plurality of corresponding attribute volumes using a pixel shader of the graphics card by the voxel intermixing to filter and remove data from the first combined attribute volume or the first plurality of corresponding attribute volumes and to form a second combined attribute volume or a second plurality of corresponding attribute volumes;

processing the second combined attribute volume or the second plurality of corresponding attribute volumes using a pixel shader of the graphics card by the pixel intermixing to form a third combined attribute volume or a third plurality of corresponding attribute volumes, wherein the third combined attribute volume or the third plurality of corresponding attribute volumes correspond to a rendered image or rendered images; and processing the third combined attribute volume or the third plurality of corresponding attribute volumes using the graphics card by the image intermixing to form the final image that combines the rendered image or rendered images based on the third combined attribute volume's attributes or the third plurality of corresponding attribute volumes' attributes.

2. The method of claim 1, wherein the final image is computed and displayed in real time.

3. The method of claim 2, wherein the final image is displayed at a frame rate of at least 12 frames per second as the final image is resited or moved.

4. The method of claim 1, wherein the final image represents a combined image of the plurality of three-dimensional volume data sets.

5. The method of claim 1, wherein the voxel intermixing is performed with a pixel shader.

6. The method of claim 1, wherein the pixel intermixing is performed by bump mapping.

7. The method of claim 1, wherein the image intermixing is performed by overlapping images.

8. The method of claim 1, further comprising the selection of an equation for voxel intermixing, an equation for pixel intermixing and an equation for image intermixing.

9. The method of claim 1, wherein the final image represents a combined two-dimensional image of the plurality of three-dimensional data sets.

10. The method of claim 1, wherein the final image represents a combined three-dimensional image of the plurality of three-dimensional data sets.

11. A non-transitory computer readable medium having computer executable instructions for imaging a plurality of three-dimensional volume data sets, which represent different attribute volumes, as a final image, the instructions being executable to implement:

accepting input from a user at runtime to identify the different attribute volumes to be intermixed, wherein intermixing the different attribute volumes corresponds to combining attributes for the different attribute volumes, wherein the attributes are associated on a data level, a voxel level, a pixel level, or an image level;

accepting an equation from a user at runtime to be used at any selected step of intermixing from voxel intermixing, pixel intermixing, and image intermixing;

processing each attribute volume without a graphics card by data intermixing to form a first combined attribute volume or a first plurality of corresponding attribute volumes based on the different attribute volumes, wherein the data intermixing applies to intermixing tasks not suitable for the graphics card;

processing the first combined attribute volume or the first plurality of corresponding attribute volumes using a pixel shader of the graphics card by the voxel intermixing to filter and remove data from the first combined attribute volume or the first plurality of corresponding attribute volumes and to form a second combined attribute volume or a second plurality of corresponding attribute volumes;

processing the second combined attribute volume or the second plurality of corresponding attribute volumes using a pixel shader of the graphics card by the pixel intermixing to form a third combined attribute volume or a third plurality of corresponding attribute volumes, wherein the third combined attribute volume or the third plurality of corresponding attribute volumes correspond to a rendered image or rendered images; and processing the third combined attribute volume or the third plurality of corresponding attribute volumes using the graphics card by the image intermixing to form the final image that combines the rendered image or rendered images based on the third combined attribute volume's attributes or the third plurality of corresponding attribute volumes' attributes.

12. The computer readable medium of claim 11, wherein the final image is computed and displayed in real time.

13. The computer readable medium of claim 12, wherein the final image is displayed at a frame rate of at least 12 frames per second as the final image is resized or moved.

14. The computer readable medium of claim 11, wherein the final image represents a combined image of the plurality of three-dimensional volume data sets.

15. The computer readable medium of claim 11, wherein the voxel intermixing is performed with a pixel shader.

16. The computer readable medium of claim 11, wherein the pixel intermixing is performed by bump mapping.

17. The computer readable medium of claim 11, wherein the image intermixing is performed by overlapping images.

18. The computer readable medium of claim 11, further comprising the selection of an equation for voxel intermixing, an equation for pixel intermixing and an equation for image intermixing.

19. The computer readable medium of claim 11, wherein the final image represents a combined two-dimensional image of the plurality of three-dimensional data sets.

20. The computer readable medium of claim 11, wherein the final image represents a combined three-dimensional image of the plurality of three-dimensional data sets.

21. The computer readable medium of claim 11, wherein the instructions are executable to further implement:

color mapping and filtering the first combined attribute volume or the first plurality of corresponding attribute volumes using the graphics card to form the final image.

22. The computer readable medium of claim 11, wherein the instructions are executable to further implement:

sampling or interpolating each attribute volume using the graphics card;

processing each attribute volume using the graphics card by voxel intermixing to form a first combined attribute volume or a first plurality of corresponding attribute volumes; and color mapping and filtering the first combined attribute volume or the first plurality of corresponding attribute volumes using the graphics card to form the final image.

23. The computer readable medium of claim 11, wherein the instructions are executable to further implement:

sampling or interpolating each attribute volume using the graphics card;

color mapping and filtering each attribute volume using the graphics card; and processing each attribute volume using the graphics card by pixel intermixing to form the final image.

24. The computer readable medium of claim 11, wherein the instructions are executable to further implement:

sampling or interpolating each attribute volume using the graphics card;

color mapping and filtering each attribute volume using the graphics card; and processing each attribute volume using the graphics card by image intermixing to form the final image.

25. The computer readable medium of claim 11, wherein the instructions are executable to further implement:

sampling or interpolating each attribute volume using the graphics card;

processing each attribute volume using the graphics card by voxel intermixing to form a first combined attribute volume or a first plurality of corresponding attribute volumes;

color mapping and filtering the first combined attribute volume or the first plurality of corresponding attribute volumes using the graphics card; and processing the first combined attribute volume or the first plurality of corresponding attribute volumes using the graphics card by pixel intermixing to form the final image.

* * * * *